Jan. 10, 1933. P. A. SOLEM ET AL 1,893,566
HOPPER FEED FOR ENDLESS BED MACHINES
Filed March 20, 1930   2 Sheets-Sheet 1

Inventors:
Peter A. Solem
By Dennis J. McLaughlin
Wilson, Dowell, McCanna + Rehm
Attys.

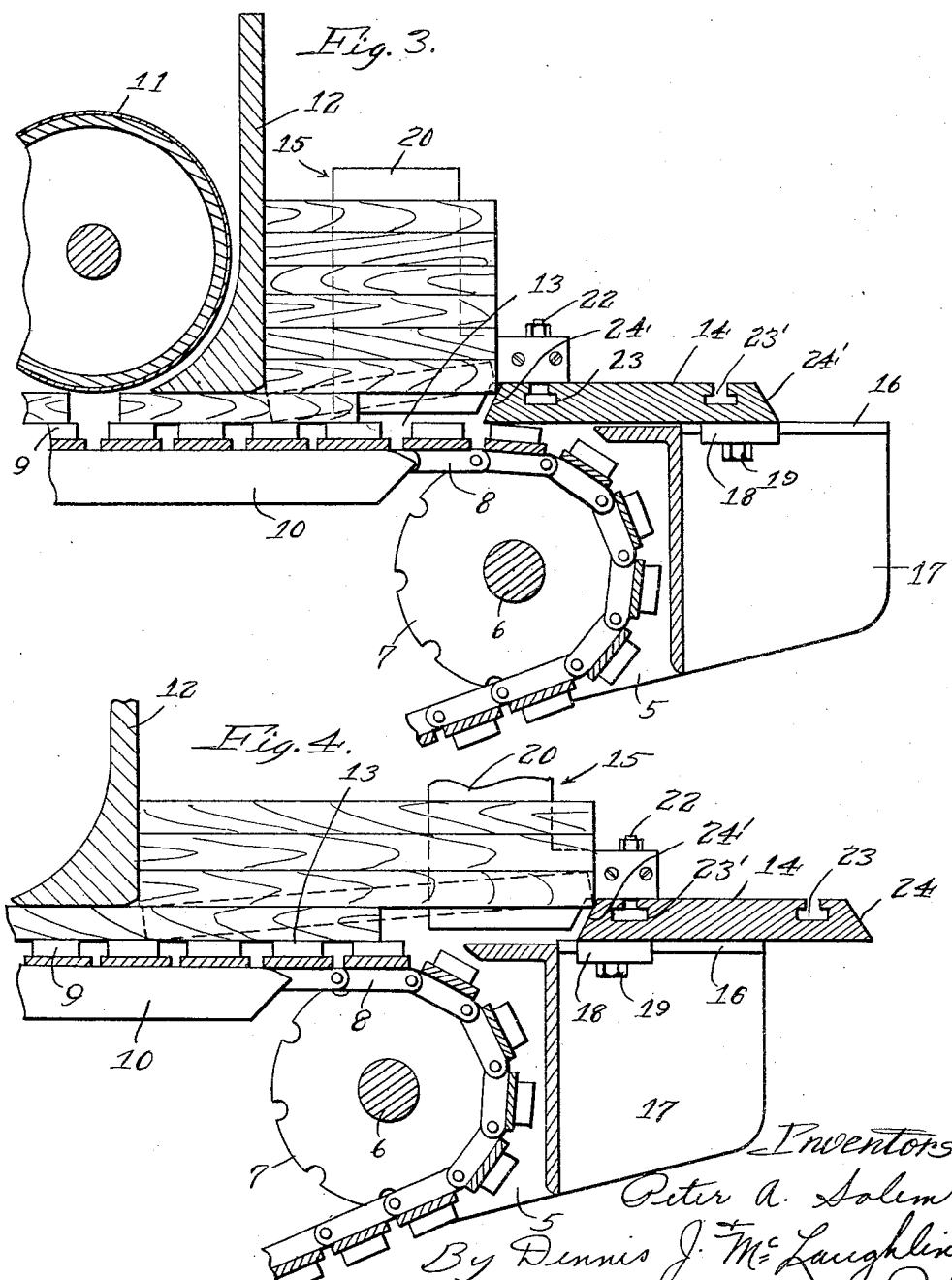

Patented Jan. 10, 1933

1,893,566

UNITED STATES PATENT OFFICE

PETER A. SOLEM, OF ROCKFORD, ILLINOIS, AND DENNIS J. McLAUGHLIN, OF ILION, NEW YORK; SAID McLAUGHLIN ASSIGNOR TO SAID SOLEM

HOPPER FEED FOR ENDLESS BED MACHINES

Application filed March 20, 1930. Serial No. 437,351.

This invention relates to a hopper or magazine feed for the feeding of work to endless bed machines generally, and more particularly endless bed sanders.

The object is to permit the stacking of small, narrow work pieces, such as rails and stretchers, on the in-feed table surface of machines of the kind referred to to be fed automatically in the operation of the endless bed, whereby to enable one operator to attend to several machines, and, furthermore, multiply the output per machine and thus cut down labor and machine cost to a small fraction of what would otherwise be involved.

According to our invention, a series of parallel baffle plates are mounted on a base plate at the in-feed end of the machine over the in-feed table surface, between which the work can be stacked in abutment with the front pressure bar so that the pieces will be fed automatically one at a time from each stall of the multiple stall hopper or magazine formed by the plates. The plates are suitably adjustable on the base plate transversely of the bed to suit different widths of work, and the base plate is adjustable on the frame toward and away from the pressure bar according to the length of work pieces to be handled.

A special feature of the base plate is its front beveled edge which serves two purposes; namely, that of preventing a jam in the feeding of the pieces by keeping the stack from tilting, and that of assisting in the feeding of each piece at the beginning of its movement from beneath the stack. Another feature is that of making the base plate reversable with both edges beveled for the purposes mentioned, with the object of enabling the handling of extremely short or long pieces without making the ways for the adjustment of the plate on the frame of proportionate length.

The invention is illustrated in the accompanying drawings, wherein—

Figs. 3 and 4 are longitudinal vertical sections of the in-feed end of the machine showing the hopper feed as adapted for the feeding of short pieces in Fig. 3 and long pieces in Fig. 4.

The same reference numerals are applied to corresponding parts throughout the views.

Figure 1:
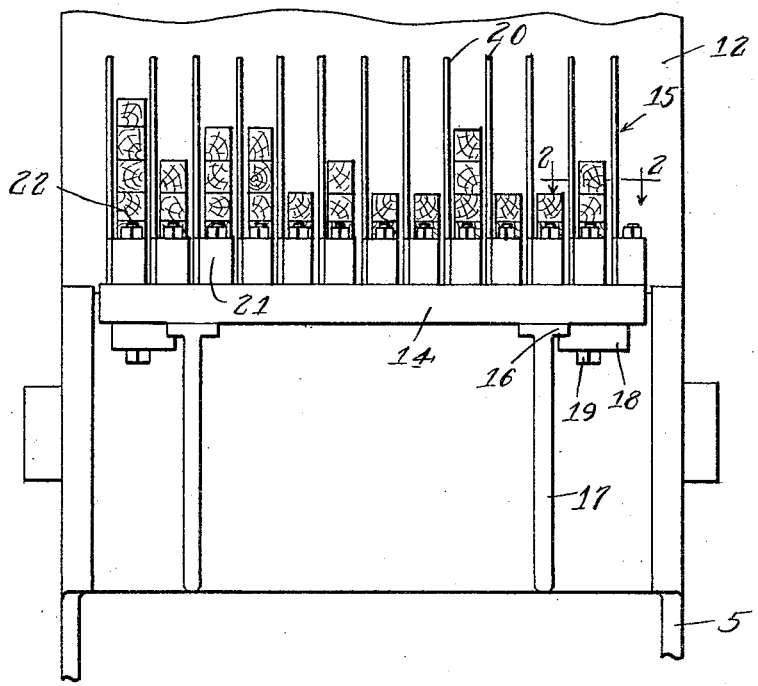
Figure 1 is a view looking at the in-feed end of an endless bed sander equipped with our improved hopper feed.
Figure 2:
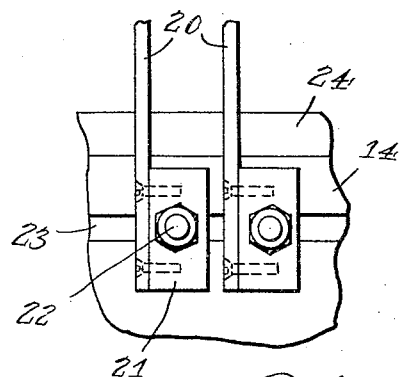
Fig. 2 is a fragmentary plan view taken on the line 2—2 of Figure 1.

The machine in connection with which our invention is illustrated is an endless bed drum type sander, but it will soon be evident that the invention is not limited to this application but could be used in connection with machines for other purposes, as for example, endless bed molders and the like.

The frame of the machine is designated by the reference numeral 5, and has sprocket shafts 6 received in bearings therein at opposite ends of the machine, the sprockets 7 at the in-feed end being idlers and having the sprocket chain 8 of the endless bed 9 engaging the same. The numeral 10 is applied to one of several longitudinal bed rails providing intermediate and end support for the slats of the endless feed bed. The foremost drum 11, which is suitably motor or otherwise power operated, appears in Fig. 3 behind the front pressure bar 12, the drums and pressure bars all extending transversely with respect to the frame over the endless bed and being suitably supported on the frame, as is well known. The disposition of the front pressure bar is such as to leave enough of the endless bed exposed to provide an in-feed table surface, indicated at 13. So much for a general understanding of the machine itself. In the operation of these machines, it is the usual practice to feed the work one piece at a time, placing it on the in-feed table surface 13. It would, however, involve too much labor and machine cost to handle smaller work that way. Small narrow pieces, such as rails and stretchers, can be fed through the machine, several pieces at a time, so as to take advantage of the full width of the sanding drums. The hopper feed, provided in accordance with our invention, enables the stacking of such work the full width of the machine on the in-feed table surface to be fed automatically a number of pieces at a time but only one at a time from each of the stalls of the hopper or magazine.

According to our invention, a base plate 14 for the hopper or magazine 15 is disposed transversely with reference to the endless bed 9 and slidably adjustable on longitudinal ways 16 provided on bracket extensions 17 of the frame 5, through the medium of blocks 18 bolted to the under side of the plate, as indicated at 19. The tightening of the bolts serves to clamp the plate 14 in adjusted position. The hopper 15 has a plurality of separate stalls or compartments formed between spaced parallel baffle plates 20. The baffles are disposed vertically and fastened to the sides of blocks 21 mounted on the base plate 14 for adjustment transversely with reference to the bed, as by means of bolts 22 received in a T-slot 23 which are arranged when tightened to clamp the baffles in adjusted position. The baffles extend forwardly from the base plate over the in-feed table surface 13 so that the stacks of work pieces in the stalls have the lowermost ones resting on the bed. The edge of the base plate 14 is beveled, as shown at 24, for a purpose which will presently appear. In the handling of short pieces, the plate 14 is disposed, as shown in Fig. 3, close to the front pressure bar 12, but in the handling of long pieces it is disposed as shown in Fig. 4, farther away from the pressure bar 12. The ways 16 are long enough so that the plate 14 if adjusted to the outermost end of the ways would accommodate pieces much longer than those shown in Fig. 4. It is desired, however, to keep the length of the ways 16 down to a minimum and still provide for a big range of adjustment for the plate 14. This we accomplish by making the plate 14 reversible end for end so that the blocks 18, which are at the rearward edge of the plate when it is adjusted forwardly as far as possible as shown in Fig. 3, are disposed at the forward edge when the plate is turned around, as shown in Fig. 4. For this reason the other longitudinal edge of the plate 14 is also beveled, as indicated at 24', and another T-slot 23', corresponding to the slot 23, is provided in the same relation to the beveled edge 24' as the slot 23 is related to the beveled edge 24. If desired, however, instead of making the plate reversible, we may provide two sets of bolt holes for the bolts 19 near the forward and rearward edges of the plate; then, when the plate is to be disposed as shown in Fig. 3, the bolts will be entered in the rear set of holes, and when it is to be disposed as shown in Fig. 4, the bolts will be entered in the forward set of holes.

In operation, while the drive for the endless bed 9 is disengaged, the attendant stacks work pieces in the stalls of the hopper or magazine as high as the baffles 20 permit and then throws the endless bed 9 into operation for feeding the work through the machine to be sanded. As many pieces as there are stalls will be fed into the machine at one time, one piece from each stall of the hopper. The bed in its travel pulls out the lowermost piece from each stack and the piece immediately above it is then supported at the rear end by engagement with the beveled edge 24 or 24' of the base plate 14, its front end being naturally supported by engagement with the top of the lowermost piece until the latter has passed completely from under the stack. When that occurs the piece immediately above it drops down, front end first, as indicated in dotted lines in Figs. 3 and 4, and the rear end thereof commences to ride down the beveled edge of the plate 14 and is thereby urged forwardly into the machine. It will be obvious that if the beveled edge were not provided, when the piece feeding into the machine was over half-way in, the entire stack would tend to tilt on the rear end of the lowermost piece as a fulcrum and the bed would be very apt to come into engagement with the rear end of the next piece and a jam would result between the bed and the pressure bar. With our arrangement, however, there is no possibility of that happening, and it is obvious that no matter whether the work is long or short, it will always drop onto the bed front end first and thus be fed into the machine properly. Damage to the bed or breakage of some part of the machine caused by jamming is thereby entirely avoided.

It is believed the foregoing description conveys a clear understanding of our invention and all of its objects and advantages. The appended claims have been drawn so as to cover all legitimate modifications and adaptations.

We claim:

1. In an endless bed machine comprising a frame, and an endless feed bed operating thereon having an exposed portion constituting an in-feed table surface, a pair of vertically disposed stack supporting members arranged in parallel laterally spaced relation over the in-feed table surface of said bed and permitting the stacking of work pieces therebetween to be fed by the bed into the machine, a front abutment for the stack of pieces preventing forward movement of all but the lowermost piece whereby the endless bed is arranged to pull out only the lowermost piece from the stack, and a rear abutment providing an inclined bearing surface for engagement with the rear end of the next to the lowermost piece whereby to support the stack against tilting to the rear during the withdrawal of the lowermost piece and also insure the dropping down of the next to the lowermost piece front end first onto the bed after withdrawal of the lowermost piece, the said piece being urged forwardly by the riding downwardly of its rear end on the aforesaid inclined surface.

2. A hopper feed attachment for an endless bed machine, such as an endless bed sander, comprising a base plate arranged to be mounted behind the in-feed table surface of the feed bed of the machine and transversely with reference to the bed, and a plurality of baffle plates mounted thereon and extending forwardly therefrom for disposition over the in-feed table surface, said baffles being disposed vertically and in laterally spaced and substantially parallel relation to one another.

3. A structure as set forth in claim 2 including a vertical abutment in front of the base plate, and wherein the front edge of the base plate is beveled so as to provide a forwardly and downwardly inclined surface for the purpose of supporting a stack of work pieces against tilting to the rear during withdrawal of the lowermost piece and insuring the dropping down of the next to the lowermost piece front end first onto the bed after withdrawal of the lowermost piece, the said piece being urged forwardly by riding downwardly at its rear end on the aforesaid inclined surface.

4. A structure as set forth in claim 2 wherein the baffle plates are detachably mounted on the base plate for adjustment longitudinally thereof transversely of the bed and are arranged to be mounted on the base plate projecting from either of its longitudinal edges, the said base plate being reversible end for end with reference to the machine and having both of its longitudinal edges beveled for the purposes herein described.

5. A structure as set forth in claim 2 wherein the base plate is arranged to be fastened to the frame of the machine adjacent one of its longitudinal edges, the said base plate being reversible end for end for the purposes herein described, and wherein the baffle plates are arranged to be mounted on the base plate so as to project from either of its longitudinal edges, both of the longitudinal edges of said plate being beveled for the purposes herein described.

6. In an endless bed sander comprising a frame, an endless bed operating thereon having an exposed portion constituting an in-feed table surface, and a front pressure bar in front of the in-feed table surface of said bed, a base plate disposed behind said in-feed table surface transversely with reference to the bed and adjustably mounted on longitudinal ways provided on said frame for adjustment toward and away from the pressure bar, the said plate being fastened adjacent one of its longitudinal edges whereby to permit adjustment thereof bodily toward or away from the pressure bar independently of the adjustment afforded on the frame of the machine itself by reversal end for end, the forward edge of the base plate being beveled for the purpose described, and a plurality of vertically disposed plates mounted on the base plate and extending forwardly therefrom toward the pressure bar, said plates being adjustable lengthwise of the base plate transversely of the feed bed and being disposed in suitably spaced parallel relation to one another.

In witness of the foregoing we affix our signatures.

PETER A. SOLEM.
DENNIS J. McLAUGHLIN.